UNITED STATES PATENT OFFICE.

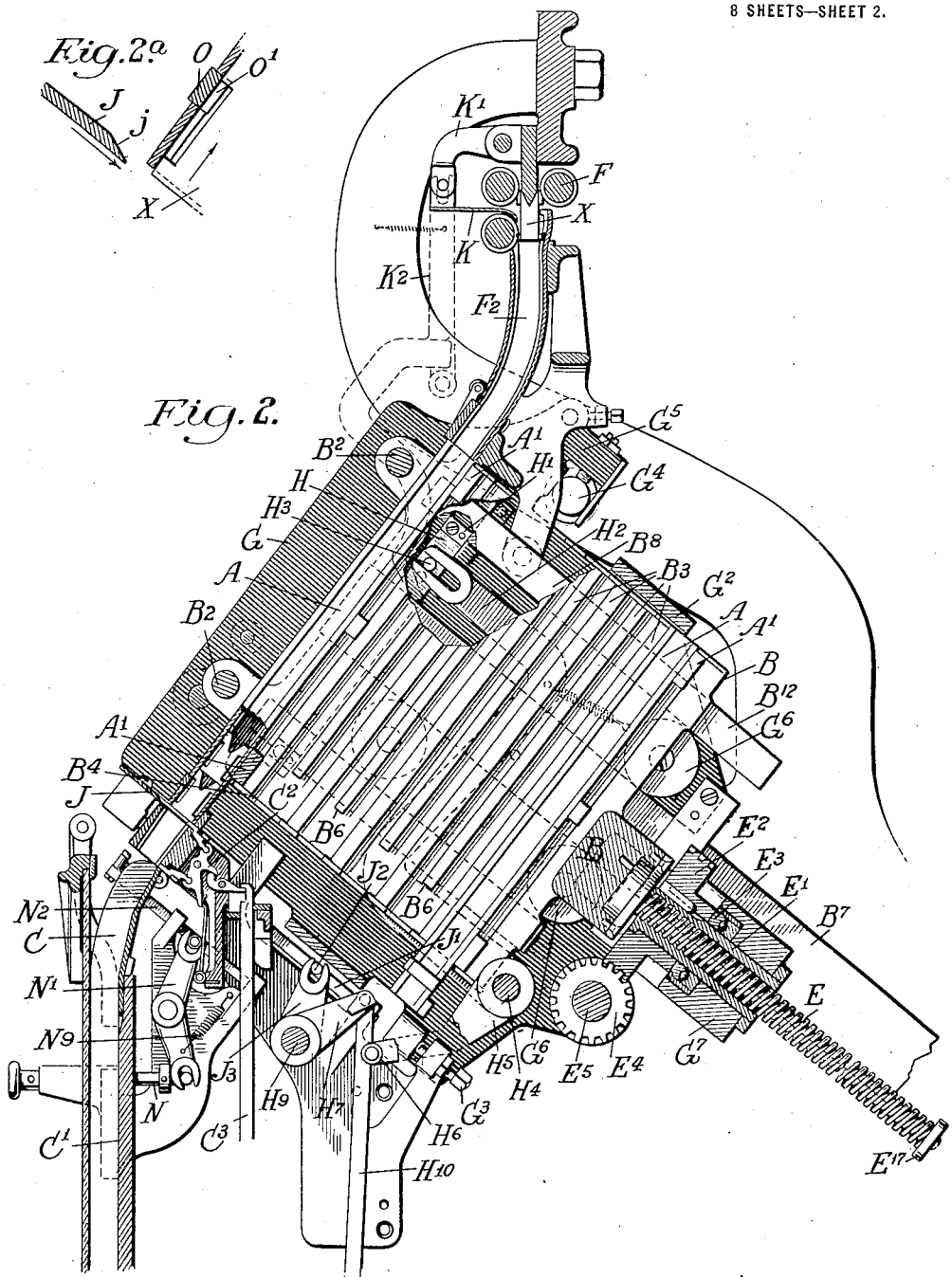

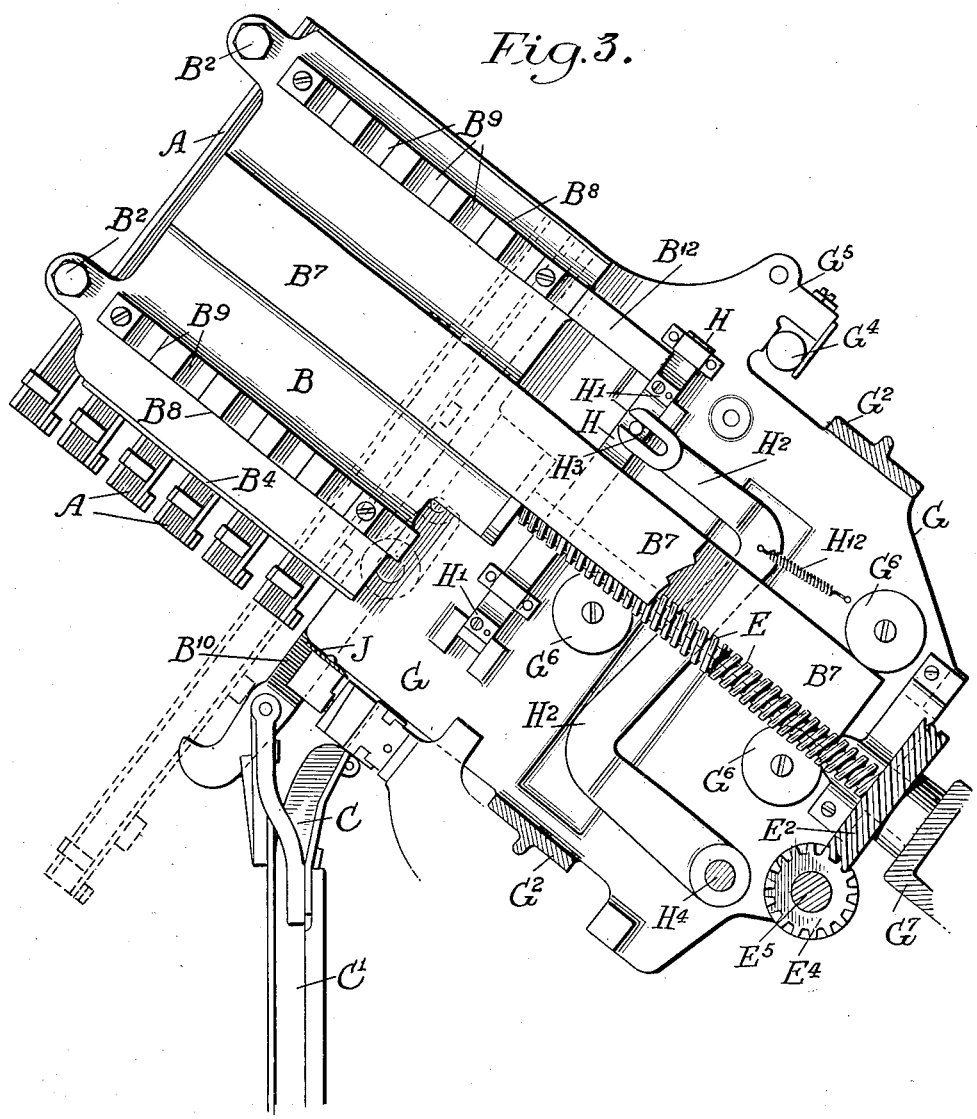

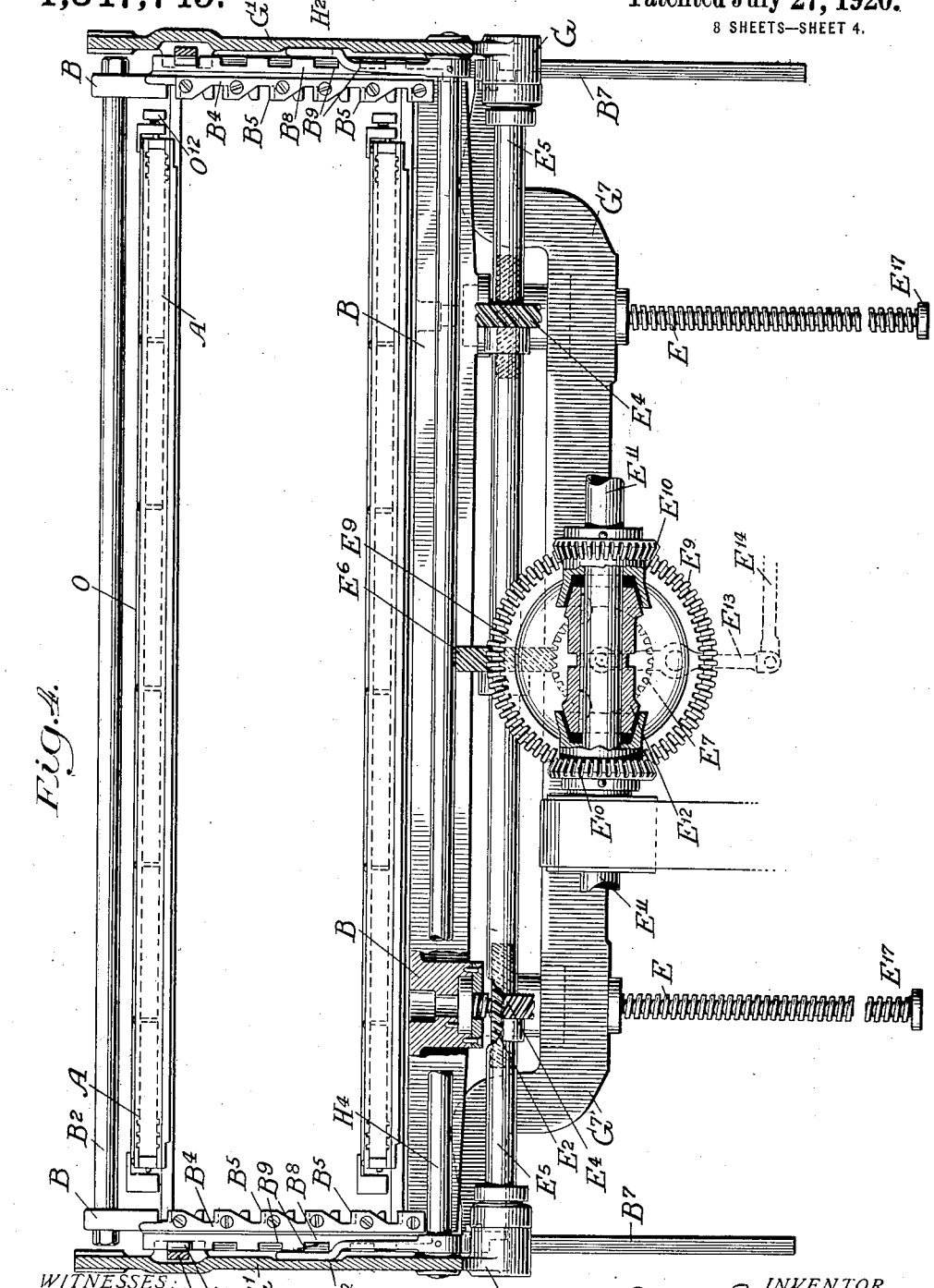

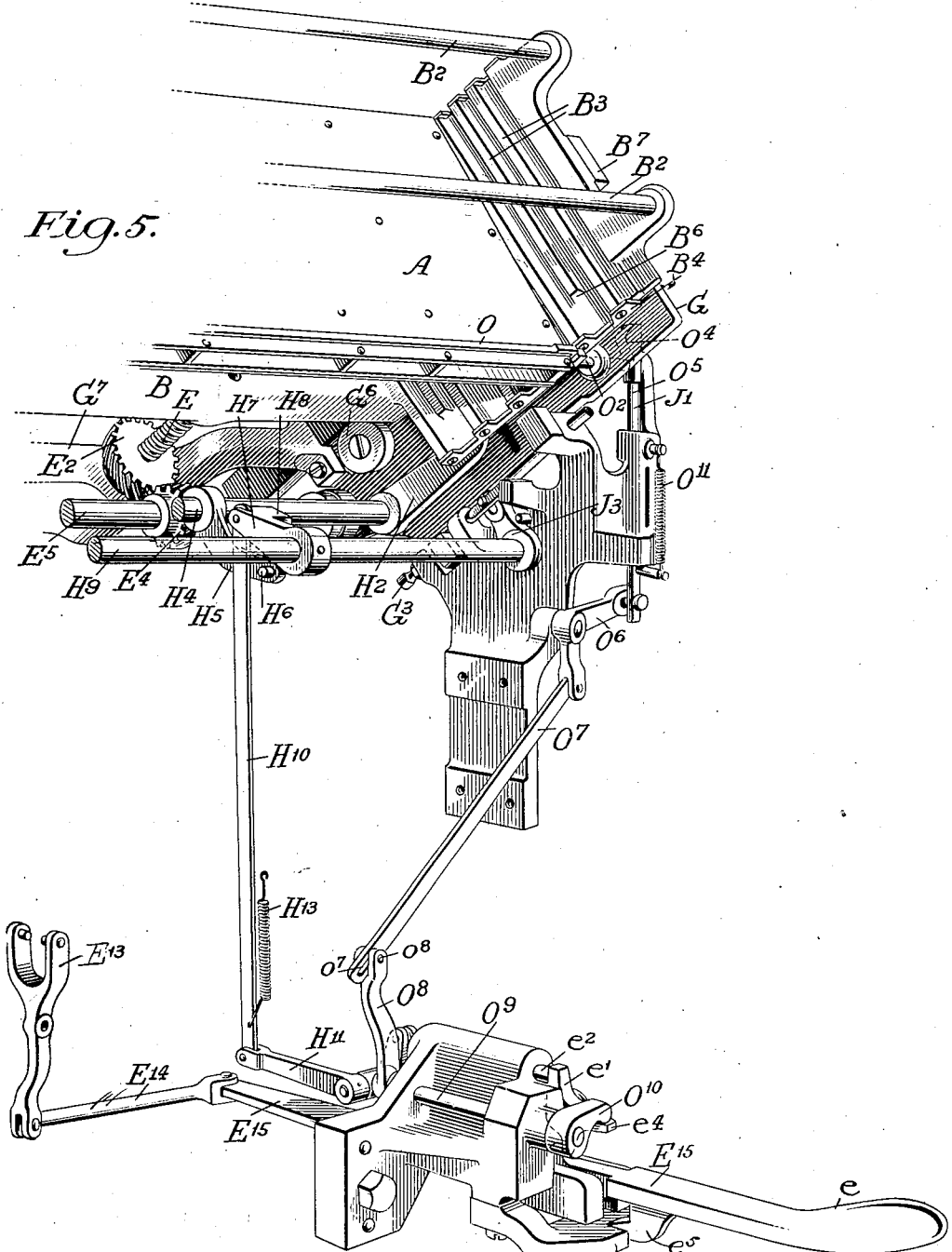

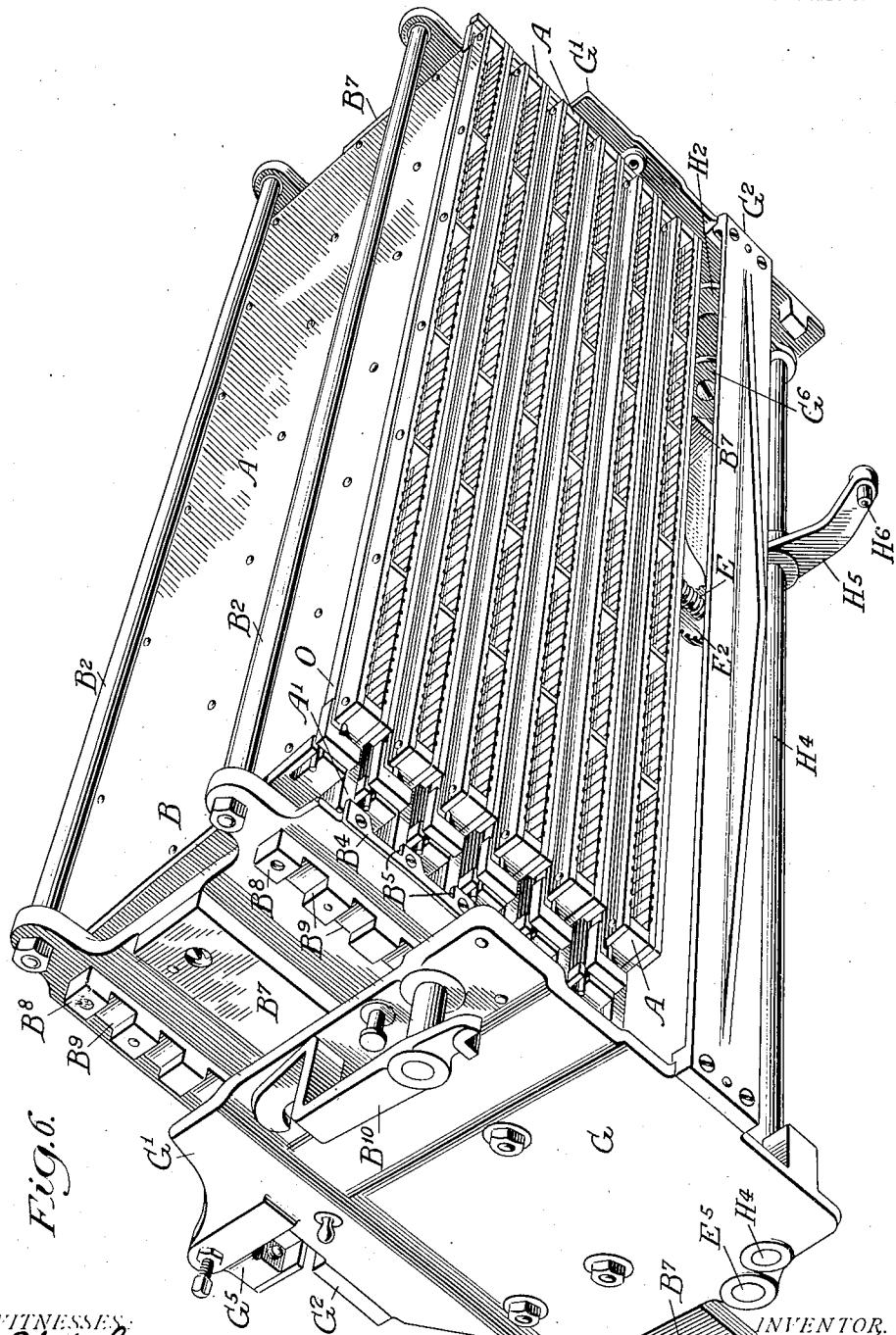

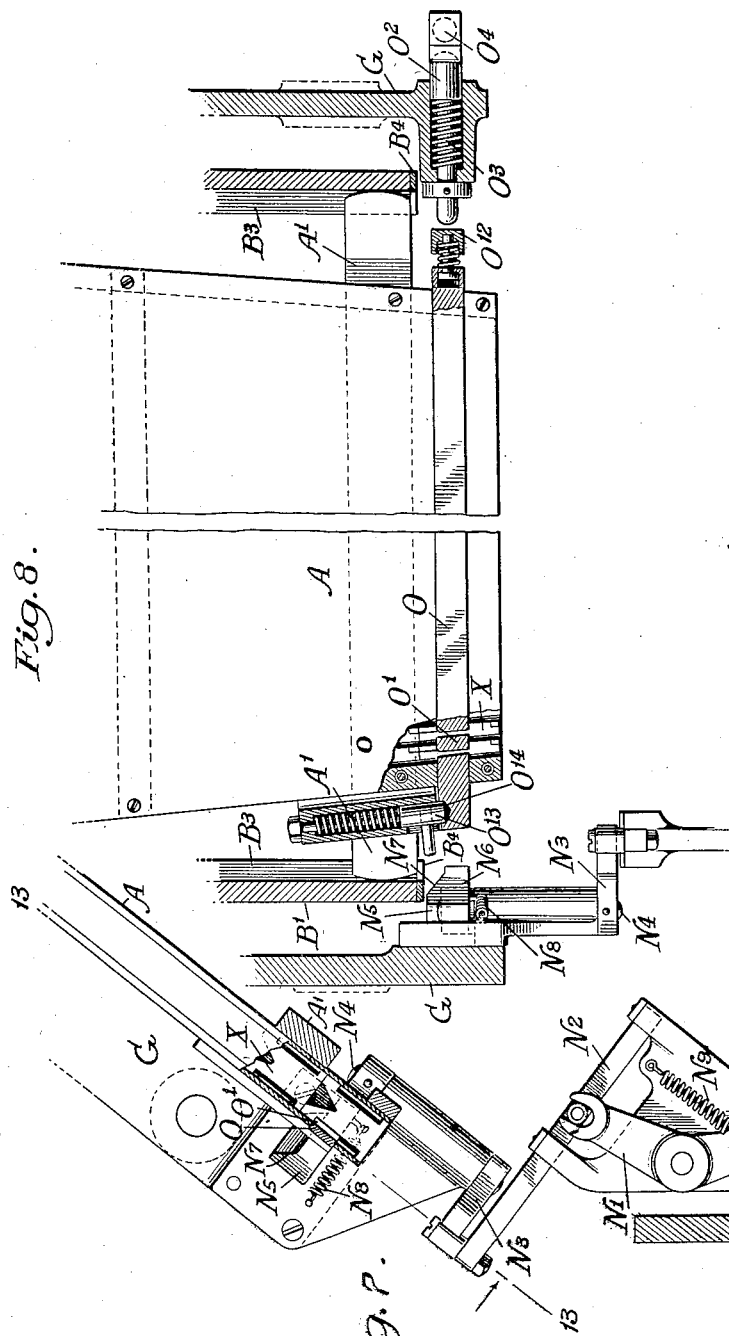
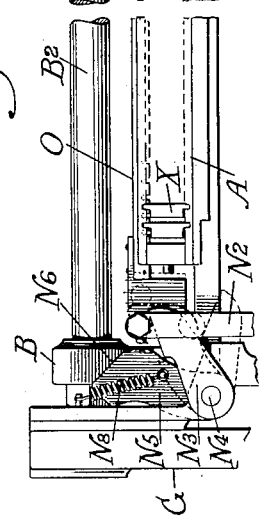

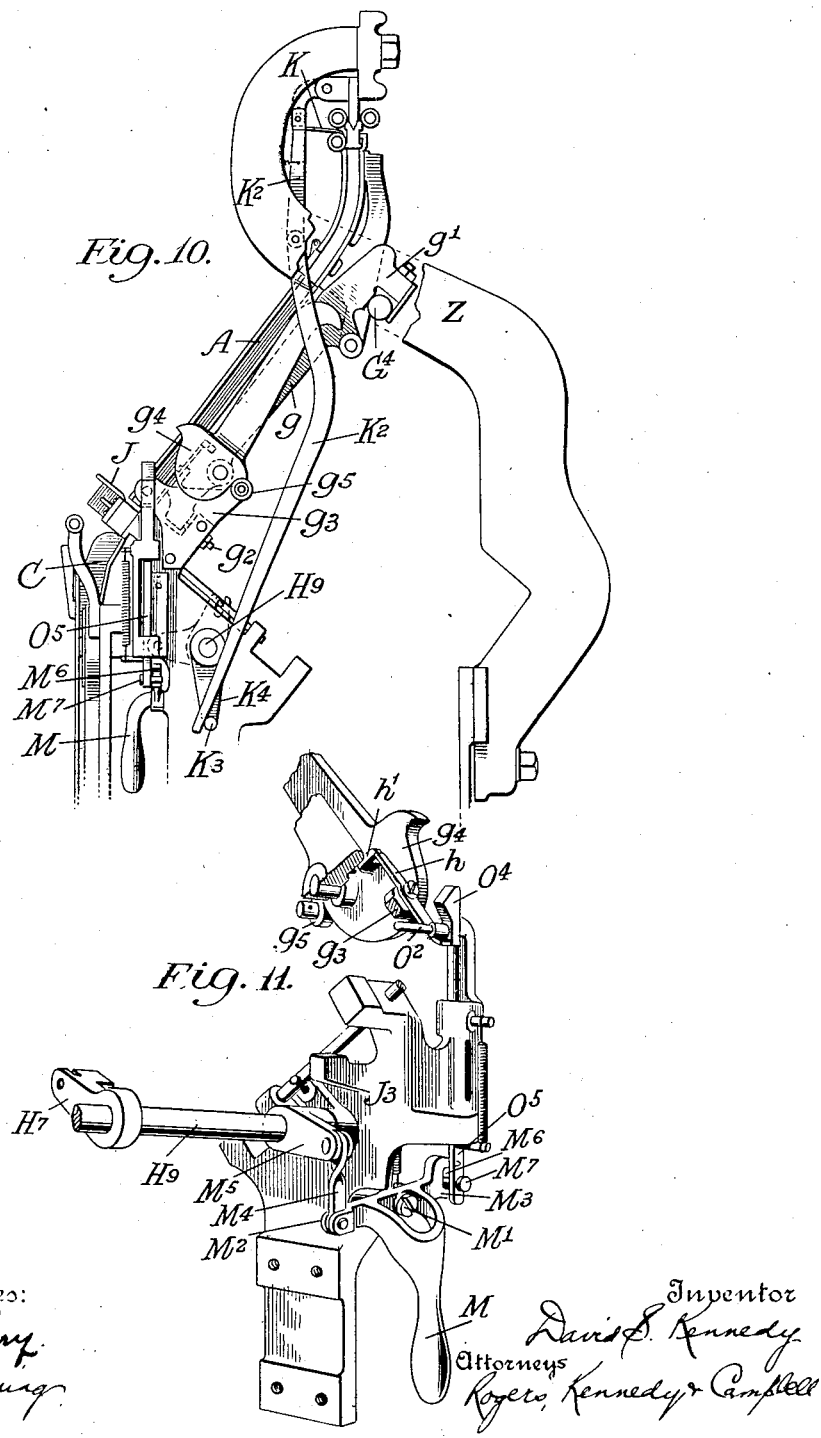

DAVID S. KENNEDY, OF BROOKLYN, NEW YORK, ASSIGNOR TO MERGENTHALER LINOTYPE COMPANY, A CORPORATION OF NEW YORK.

TYPOGRAPHICAL MACHINE.

1,347,745.        Specification of Letters Patent.      Patented July 27, 1920.

Application filed November 30, 1917. Serial No. 204,534.

*To all whom it may concern:*

Be it known that I, DAVID S. KENNEDY, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent of the United States to O. Mergenthaler, No. 436,532, wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter returned through a distributing mechanism to the magazine from which they started.

My invention, generally speaking, is intended to adapt these machines for handling matrices with characters of greatly increased size or point, such as are used in advertising matter or display work, and also to provide a varied assortment of such matrices or a large number of different fonts which may be interchanged at will in the production of the desired matter. The manner in which these results are accomplished, and the combinations of the parts employed in carrying them into effect, will be fully set forth in the detailed description to follow.

In the accompanying drawings, I have shown my improvements in preferred form and by way of example and as applied to a machine of the kind noted. It will be obvious, however, that they may be embodied in other forms and applied to machines of other constructions without departing from the spirit of my invention. Generally speaking, I desire it to be understood that I do not limit myself to any specific form or embodiment, except in so far as such limitations are specified in the claims.

Referring to the drawings:

Fig. 2 is a vertical section taken through the magazines and the assembling and distributing devices, with certain of the parts broken away to expose other parts to view;

Figure 1:
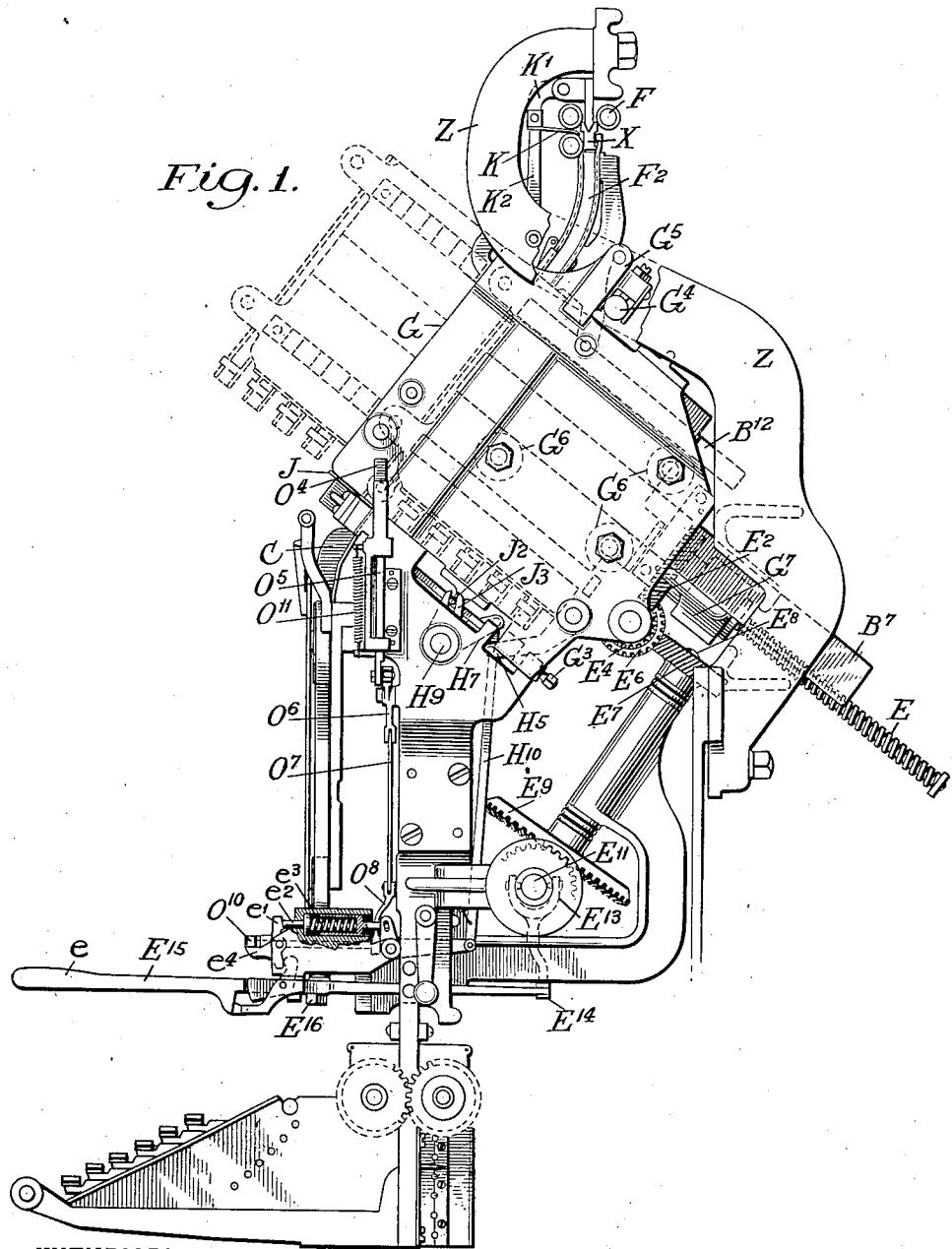
Figure 1 is a side elevation of a portion of a linotype machine having my invention applied thereto.

Fig. $2^a$ is a detail of the matrix feeler;

Fig. 3 is a side elevation of the magazine shift frame with the magazines located therein and illustrating the manner in which a selected magazine is removed;

Fig. 4 is a front view on an enlarged scale of the magazine shift frame, with some of the magazines omitted, and showing the general arrangement of the shifting devices;

Fig. 5 is a front perspective view of a portion of the magazines and their shift frame, and showing in particular the controlling hand lever for the magazine shifting mechanism and its connections to the other parts;

Fig. 6 is a front perspective view of the detached magazine unit;

Figs. 7, 8 and 9 are side, plan and front views of the lower portion of a magazine, illustrating in particular the matrix locking device and its manner of operation; and Figs. 10 and 11 illustrate the use of a single magazine in the machine and a modification.

The matrices X are stored according to font in the magazines A, of which there are six in number, although a greater or less number might be employed if desired. These magazines are carried in or by a shift frame B which is arranged to be shifted upwardly and downwardly in the machine frame to bring any selected magazine into registration at its lower end with the fixed throat C which communicates with the usual front plate or raceway $C^1$, and at its upper end with the magazine entrance $F^2$ leading from the distributer F mounted in the supporting bracket Z.

The matrices are released from the selected magazine by a single series of escapements $C^2$ located in the throat C and actuated by reeds $C^3$, and each comprising, as usual, (Fig. 2) a pivoted lever and two pawls which are projected thereby alternately into the throat in effecting the release of the matrix. The arrangement and operation of the escapements are the same as shown and described in my previous Letters Patent No. 1,115,211, and therefore require no further description here. It may be stated, however, that the action of the escapements is such that they hold the lowermost matrices in the active magazine and after their actuation leave the throat C entirely clear of matrices, so that the magazines are free to be moved at any time without preparatory operations.

Taking up first the manner in which the magazines are supported in the machine (reference being had to Figs. 1 to 6), it will be noted that the shift frame B comprises two side plates or members $B^1$ which are suitably spaced apart by means of tie-rods $B^2$. The plates $B^1$ are formed on their inner faces with longitudinal parallel ledges $B^3$ forming between them grooves wherein are slidably arranged the opposite ends of transverse bars $A^1$ secured rigidly to the under side of each of the magazines A at the front and rear. The magazines are held in place in the shift frame by vertical strips or plates $B^4$ secured to the forward edges of the two side members $B^1$ and formed with laterally extending lips $B^5$, which project partly across the grooves between the ledges $B^3$ and thus serve as abutments for the cross bars $A^1$ of the magazines (Fig. 4). In removing any selected magazine, therefore, it is merely necessary to lift it slightly at its forward end so as to disengage its cross bar $A^1$ from the lips $B^5$ and then to draw it forwardly from the frame. Every other pair of ledges $B^3$, or those which constitute the upper walls of the grooves, are cut away or recessed at their forward ends, as at $B^6$, so as to receive the projecting ends of the transverse bars $A^1$ when the magazines are lifted in the manner stated.

The shift frame B is mounted in and carried by a supplemental supporting frame G comprising two side plates $G^1$ which are connected together by transverse bars or braces $G^2$. When mounted in the machine, the frame G is sustained at its front upon a pair of set screws $G^3$ and at its rear upon a transverse bar $G^4$ both fastened to the main frame, the side plates $G^1$ of the supplemental frame being provided at their rear edges with hook-shaped members $G^5$ which embrace the bar $G^4$ and hold the frame against displacement in a forward direction. To sustain and guide the shift frame B in its vertical movements, the side plates $G^1$ of the frame G are provided on their inner faces with rollers $G^6$ which engage the opposite edges of long plates $B^7$ connected rigidly to and projecting downwardly from the side members $B^1$ of the shift frame.

The raising and lowering of the shift frame B is effected by power-driven mechanism controlled by the operator while seated at the keyboard. Such mechanism (Fig. 4) comprises a pair of screw rods E loosely connected at their upper ends to the shift frame B or extensions thereof and threaded into sleeves or nuts $E^1$ keyed to rotary gears $E^2$ supported upon a bracket member or bar $G^7$ secured at its opposite ends to the side members $G^1$ of the frame G. If desired, anti-friction bearings $E^3$ may be interposed between the gears and the supporting bracket (Fig. 2). Intermeshing with the gears $E^2$ are right angularly disposed gears $E^4$ fixed to a transverse shaft $E^5$ journaled in the supplemental frame G. This shaft is provided at the center thereof with a further gear $E^6$ which meshes with a right angularly disposed gear $E^7$ secured to the rear end of a fore-and-aft inclined shaft $E^8$ journaled in bearings in the main frame. It may be noted at this point that the gears $E^2$ and $E^4$ and the gears $E^6$ and $E^7$ have their intermeshing teeth of spiral or helical form so as not only to provide for their right angular disposition, but also to facilitate the shifting of the magazines and to insure the equal rotation of the screw rods E as well as to prevent backlash, etc. At its forward end, the shaft $E^8$ is provided with a large bevel gear $E^9$ arranged in permanent engagement at opposite sides with two small bevel pinions $E^{10}$ loosely mounted upon the constantly rotating shaft $E^{11}$, known as the "intermediate" shaft of the machine, and which operates the assembling and distributing devices. Located between the two bevel pinions $E^{10}$ is a clutch sleeve $E^{12}$ (Fig. 4) splined to the shaft $E^{11}$ so as to be slid endwise thereon in opposite directions into engagement with either one of the pinions to cause the magazines, through the intermediate parts, to be raised or lowered, as desired.

For the purpose of controlling the clutch sleeve $E^{12}$, there is provided a forked member $E^{13}$ connected by a link $E^{14}$ to a horizontal hand lever $E^{15}$ pivoted between its ends, as at $E^{16}$, to the main frame (Fig. 1). In the present instance, as in my prior Letters Patent No. 1,109,683, the hand lever $E^{15}$ is provided with a pivoted grip portion $e$ adapted to coöperate through an intermediate lever $e^1$ with a sliding plunger $e^2$ formed in two relatively movable sections which are held apart by an interposed spring $e^3$. The grip portion $e$ is formed with a depending nose $e^5$ normally located between a pair of fixed abutments $e^6$ and which thus prevents the lateral movement of the hand lever until the grip portion is depressed. The purpose of this arrangement will subsequently appear.

The magazines are held in their shifted position by a pair of longitudinal locking bars H slidably mounted in guideways of the supplemental supporting frame G, and having at opposite ends lateral projections $H^1$ which are adapted to engage in one or another of a plurality of notches $B^9$ formed in plates $B^8$ carried by the shift frame B, there being two such plates $B^8$ applied to the outer face of each of the two side members $B^1$ and each having as many notches $B^9$ as there are magazines in the frame (Figs. 2 and 4). The locking bars H are operated by a pair of levers $H^2$ connected thereto by pin-and-slot connections $H^3$ and fixed to the opposite ends of a transverse rock shaft $H^4$ journaled in the frame G. The rock shaft $H^4$ has fast thereto a further arm $H^5$ formed with a laterally projecting pin $H^6$ adapted to be engaged by a lug $H^8$ carried by an arm $H^7$ fast to a rock shaft $H^9$ journaled in the main frame. The arm $H^7$ is connected by means of a vertical rod $H^{10}$ to the longer arm of a bell crank lever $H^{11}$ pivoted to the main frame and having its shorter arm connected to or engaged by the rear section of the spring actuated plunger $e^2$ (Figs. 1 and 5). It will be seen, therefore, that when the grip portion $e$ of the hand lever $E^{15}$ is depressed preparatory to the connection of the magazine shifting mechanism, the forward section of the plunger $e^2$ is moved rearwardly by the intermediate levers $e^1$ and compresses the spring $e^3$, thereby storing up power which is subsequently utilized to move the locking bars H to inactive position. The necessary resistance to permit this compression of the spring $e^3$ is afforded by the firm engagement of the shift frame B with the locking bars H, which cannot be drawn forwardly and which therefore prevent any further rotation of the shaft $H^9$ when its lug $H^8$ becomes engaged with the pin $H^6$ of the shaft $H^4$. However, after its grip portion is depressed, the hand lever $E^{15}$ is thrown to the right to raise the magazine shift frame slightly so as to relieve the pressure on the locking bars, whereupon the spring $e^3$ is allowed to act.

In the present embodiment, therefore, when the spring $e^3$ is released, it shifts the rear section of the plunger $e^2$ rearwardly and causes the depression of the vertical rod $H^{10}$, which throws the connected arm $H^7$ downwardly, and, through the engagement of the lug $H^8$ thereon with the laterally projecting pin $H^6$ on the arm $H^5$, depresses the latter therewith and consequently rotates the rock shaft $H^4$ so as to draw the arms $H^2$ forwardly to disengage the locking bars H from the magazine shift frame B. With the locking bars so disengaged, the hand lever $E^{15}$ may then be turned in either direction to cause the magazines to be raised or lowered as required in selecting the desired magazine.

When the selected magazine arrives in its proper position, it is automatically locked therein under the influence of springs $H^{12}$ pulling on the operating levers $H^2$, which shift the locking bars H rearwardly to cause their projections $H^1$ to enter the appropriate notches $B^9$ in the plates $B^8$ of the shift frame, it being understood that before such time the counter-force of the spring $e^3$ has been spent. A spring $H^{13}$ is also connected to the rod $H^{10}$ so as to raise it and restore the other parts to their normal position after their operation by the spring $e^3$. It is noted that the engaging portions of the two connecting arms $H^5$ and $H^7$ are normally separated from each other to permit of lost motion between the rock shafts $H^4$ and $H^9$ when the grip portion $e$ of the hand lever is depressed, such lost motion being given to provide for the preliminary operation of a matrix feeler now to be described.

Arranged to pass across the mouth of the operative magazine, or between it and the stationary assembling throat C (Figs. 1 and 2), is a blade or matrix feeler J attached to the upper ends of a pair of slides $J^1$, mounted in guideways of the main frame, and connected by pin-and-slot connections $J^2$ to operating arms $J^3$, fast to the opposite ends of the rock shaft $H^9$ previously referred to. This rock shaft, it will be remembered, is rotated by the vertical rod $H^{10}$ which is connected to the rear section of the spring-actuated plunger $e^2$ controlled by the grip portion $e$ of the hand lever $E^{15}$. It was before explained that the depression of the grip portion $e$ places the spring $e^3$ under tension because of the resistance offered to the rear section of the plunger $e^2$, but this resistance is not encountered until the connecting arms of the two rock shafts $H^4$ and $H^9$ are brought into engagement with each other, which is delayed on account of the lost motion between these shafts as above mentioned. Hence, it follows that the initial movement of the grip portion $e$ causes the two sections of the plunger $e^2$, through the interposition of the spring $e^3$, to slide rearwardly as a whole, which movement is communicated through the rod $H^{10}$ to the rock shaft $H^9$ so as to draw the blade J downwardly between the operative magazine and the throat C. Such partial rotation of the shaft $H^9$ brings its lug $H^8$ into engagement with the pin $H^6$ of the shaft $H^4$, so that any further movement of the plunger $e^2$ is resisted by the firm engagement of the locking bars H with the magazine shift frame B, as before described, thereby causing the forward section of the plunger to move rearwardly independently to compress the spring $e^3$, which subsequently withdraws the locking bars when the shift frame is slightly elevated. This action of the parts takes place only in the event that no matrices are lodged between the operative magazine and the throat C. If any matrices are present between these parts when the grip portion $e$ is depressed, they arrest the downward movement of the blade J, which then holds the shaft $H^9$ against further rotation and consequently prevents the turning of the shaft $H^4$ operating the locking bars H. When the blade J is thus arrested, the spring $e^3$ merely yields to prevent injury to the parts.

The above arrangement is similar to that shown in my Letters Patent No. 1,109,683, in the respect that the blade or feeler J prevents the unlocking of the magazines while any matrices are protruding from the one in use, but it differs materially therefrom in its manner of operation. Thus, in said patent, the matrix feeler is connected directly or positively to the magazine locking bars in such manner that the movement of the latter to unlocking position effects the movement of the feeler across the mouth of the magazine. In the present arrangement, on the other hand, the movement of the feeler is effected before that of the magazine locking bars and through connections independent thereof and direct from the hand lever controlling the magazine shifting mechanism. As a result, the unlocking of the magazines is prevented without having first to elevate the magazines to relieve the pressure on the locking bars, such as might, in the present construction, result in the spilling of the matrices. That is to say, the feeler is operated directly from the hand lever independently of the movement of the locking bars, so that the presence of any protruding matrices may be detected without having to unlock the magazines at all. Furthermore, the arrangement is such that the operation of the magazine shifting mechanism is prevented until the matrix feeler is first actuated, due to the engagement of the abutments $e^6$ with the nose $e^5$ depending from the grip portion $e$ of the hand lever.

The preliminary movement of the matrix feeler J is also relied upon to enable it to push back within the active magazine any matrices which are protruding therefrom only to a slight extent and such as have not passed beyond the path of movement of the feeler. To enable the feeler to perform this function (see Fig. 2$^a$), it is formed at its lower edge with a bevel $j$ facing toward the delivery end of the magazine and arranged to engage the protruding matrices as the blade descends and cam them back into the magazine. This camming back of the matrices also facilitates the coöperation therewith of certain locking devices incorporated in the magazines.

A further blade or feeler K is employed to prevent the unlocking of the magazines or the shifting thereof when matrices are still in course of distribution. This blade is operated as in my Patent No. 1,109,683, being carried by a pair of swinging arms $K^1$, one of which is connected by a pivoted lever $K^2$ to the magazine locking bar H.

Since the magazines are without escapements, means are provided to hold the matrices therein when they are out of operative position or when they are removed from the machine. To this end, each magazine is provided with a transverse locking plate O (Fig. 8) of the kind shown and described in the Letters Patent to M. W. Morehouse No. 1,129,892. Such plate forms in effect a section of the upper plate of the magazine, being formed with transverse ribs $O^1$ corresponding to those of the magazine, and adjustable longitudinally in opposite directions laterally of the magazine. In the position of the plate to the right, its ribs $O^1$ are located in alinement with the magazine ribs or between the intermediate grooves, which are therefore substantially continuous and permit the unimpeded passage of the matrix ears therethrough; while in its position to the left, its ribs are located out of alinement with the magazine ribs or across the intermediate grooves so as to engage the projecting ears of the matrices and lock them against escape. At their rear corners, the ribs $O^1$ are formed with beveled surfaces $o$, which not only facilitate the coöperation of the locking bar and matrices, but also act as cams to push the matrices back within the magazine and clear of the assembling throat C and the contained escapements.

The locking plates of the several magazines are adapted to be shifted to active or locking position by means of a sliding plunger $O^2$ common to all of them and which is mounted in the supporting frame G in position to engage the locking plate of the active magazine. This plunger is normally held retracted by an encircling spring $O^3$ and is pushed inwardly to actuate the locking plate by a cam $O^4$ carried at the upper end of a vertical slide $O^5$ mounted in the main frame. The slide $O^5$ is connected to one arm of a bell crank lever $O^6$, whose other arm is connected by a link $O^7$ to an upstanding arm $O^8$ fast to a fore-and-aft shaft $O^9$ (Fig. 5). At its forward end, the shaft $O^9$ has fixed thereto a further arm $O^{10}$ bearing upon a lug $e^4$ projecting forwardly from the pivoted lever $e^1$ which is operated by the grip portion $e$ of the hand lever $E^{15}$, as before described. As a result of this construction, when the grip portion $e$ is depressed, its motion is communicated directly and independently of the magazine locking bars H to the vertical slide $O^5$, which lowers the cam $O^4$ and causes it to push the actuating plunger $O^2$ inwardly against the action of its spring $O^3$ so as to shift the locking plate O of the active magazine to locking position. It will be remembered that this depression of the grip portion is necessitated because of the engagement of its nose $e^5$ with the fixed abutments $e^6$, which normally hold the hand lever E against lateral movement and consequently prevent the operation of the magazine shifting mechanism. In this way, the matrices are securely locked in the magazine before it is unlocked or shifted out of operative position by the subsequent engagement of the power-driven mechanism, thereby avoiding any danger of spilling the matrices. A spring $O^{11}$ is connected to the actuating slide $O^5$ to restore the parts to their normal position after operation, the plunger $O^2$ being retracted by its spring $O^3$.

It is pointed out that the connection between the link $O^7$ and the arm $O^8$ is constituted by a pin $o^8$ carried by the latter and playing in an elongated slot $o^7$ in the former (Fig. 5), thus allowing lost motion between the grip portion $e$ of the hand lever and the matrix locking plate O sufficient to delay the movement of the plate until the matrix feeler J has completed a portion of its downward movement. The bevel $j$ of the feeler is thus enabled to assist the bevel surfaces $o$ of the locking plate in drawing back the matrices into the magazine.

At the end adjacent the actuating plunger $O^2$ the matrix plate O is provided with a spring buffer $O^{12}$ through which the motion of the plunger is communicated thereto (Fig. 8). Under normal conditions, the resistance of the buffer is sufficient to transmit the motion of the plunger to the plate, but it will yield in the event that the plate is arrested by a matrix which has passed beyond its proper position in the magazine.

When the plate O of the active magazine has been moved to locking position as above described, it is held in such position by means of a spring actuated detent $O^{13}$ arranged at the opposite side of the magazine and adapted to snap into a recess or depression $O^{14}$ in the edge of the plate (Fig. 8). If, then, the magazine should be restored to operation or another substituted therefor by the movement of the shift frame B, it becomes necessary to shift the matrix locking plate O to its unlocking position. This is effected in the present instance by a hand rod N located at the front of the machine within easy reach of the operator and connected through the medium of a bell crank lever $N^1$ to a slide $N^2$ provided at its upper end with a pin or roller arranged in engagement with an arm $N^3$ fast on the forward end of a short fore-and-aft rock shaft $N^4$ (Fig. 7). At its rear end, the shaft $N^4$ has fast thereto a cam $N^5$ formed with two surfaces $N^6$ and $N^7$, the latter arranged to engage a pin $O^{15}$ projecting laterally from the locking detent $O^{13}$, and the former arranged to engage the end of the matrix locking plate O. When the rod N is pulled forwardly, the cam $N^5$ is rocked downwardly to bring its cam surfaces into engagement with their respective parts. The cam surface $N^7$ acts first to disengage the detent $O^{13}$ from the locking plate O, and immediately thereafter the cam surface $N^6$ comes into engagement with the locking plate O and shifts the latter to the right to unlocking position, as indicated by the dotted lines in Fig. 9. When the parts are released, they are restored to their original position by the springs $N^8$ and $N^9$, the former being connected to the swinging cam $N^5$ and the latter to the bell crank lever $N^1$.

From the foregoing it will be seen that the matrices are securely locked in all the magazines except the one in active position, and even in that one until the hand rod N is operated to shift the corresponding locking bar to unlocking position. If, after the magazine is thus brought into use, it is shifted from its active position, the matrices are again locked therein by the automatic arrangement before described. It follows, therefore, that the magazines are free to be shifted at any time without danger of spilling the matrices therefrom, and further that they may be freely removed from their shift frame to permit the substitution of others.

To remove the magazines, it is merely necessary to raise the shift frame B high enough to locate the selected one above the assembling devices, when it may be withdrawn forwardly after raising it out of engagement with the locking strips $B^4$ as before described, being supported during such movement by the usual pieces $B^{10}$ which may be connected to the supporting frame G (Fig. 3). In removing the lowermost magazine, the shift frame B is run up to its highest position, where the magazine is well above the assembling devices, as indicated in Fig. 3. When the shift frame arrives in this position, the locking bars H are snapped back to locate their lateral projections $H^1$ beneath extensions $B^{12}$ of the rear pair of notched plates $B^8$, the guiding plates $B^7$ also being extended to maintain their engagement with the guide rollers $G^6$ to support the weight of the parts. To prevent the overrun of the frame, the lifting screw rods E are provided at their lower ends with collars $E^{17}$ which bring up against the supporting brackets $G^7$ (Figs. 2 and 4).

It is pointed out that the machine is so organized that the whole magazine structure, including the magazines, their shift frame and the supplemental supporting frame with its connected elements, may be applied to or removed from the machine as a unit (see Fig. 6), the connections between the various devices (which as described are mounted partly in the main frame and the supplemental frame) being such as to be made and broken as the supplemental frame is inserted in or taken from the main frame. Thus, the gears $E^6$ and $E^7$, included in the magazine shifting connections, are arranged to be freely engaged and disengaged; and the same is true of the arms $H^5$ and $H^7$ included in the connections between the hand lever $E^{15}$ and the magazine locking bars H, and of the plunger $O^2$ and cam $O^4$ included in the connections between said hand lever and the matrix locking plate O, etc. This feature is of advantage in that it not only reduces the cost of manufacture and facilitates the assemblage of the parts, but also permits the interchange of different magazine units, which may comprise a greater or less number of magazines, or even a single magazine as is specifically referred to hereinafter.

The operation of the parts so far described will be entirely clear from the foregoing description. The construction in many respects is covered by prior patents issued to me and others, so that it seems unnecessary to enlarge upon the present specification. To those conversant with the art, the novel characteristics presented herein will be entirely clear from the foregoing and the appended claims. In this connection, it is pointed out that the general arrangement of the parts described is applicable to various types of machine known in the art and particularly to those employing a series of movable magazines. In the present instance, however, the arrangement has been adapted to a feature to be presented in a separate divisional application which comprehends an entirely new relation between and in the form of the magazines and the assembling devices.

The present machine has been so organized that it may be equipped with either a single or multiple-magazine arrangement, or converted from one into the other, as desired. Thus, in Figs. 10 and 11, there is shown a single magazine A carried by a supplemental supporting frame $g$, which is inserted in the main frame in place of the frame G, containing the series of movable magazines, etc. At its upper end, the frame $g$ is formed with a hook-shaped member $g^1$ fitting over the transverse bar $G^4$ in the same manner as the frame G. At its lower end, however, the frame $g$ is supported upon set screws $g^2$ carried by special bracket plates $g^3$ which are detachably secured to the main frame. With the exception of these special bracket plates, the framework of the machine is adapted to give support either to a single magazine or a series of movable magazines. In the use of the latter, the plates $g^3$ and the frame $g$ are removed and the frame G substituted.

In the case of a single magazine there would be no real occasion to employ the power-operated shifting mechanism, so that if it is desired to avoid the use of the parts associated with such mechanism for effecting the operation of the matrix locking plate O and the matrix feelers J and K, the modified arrangement shown in Figs. 10 and 11 may be employed. In this arrangement, the rotation of the shaft $H^9$ (which operates the feeler J) and the movement of the cam $O^4$ (which, through the plunger $O^2$ carried by one of the bracket plates $g^3$, operates the matrix locking plate O) are effected by a hand lever M, pivoted at $M^1$ to the main frame, and provided with laterally extending arms $M^2$ and $M^3$, the former being connected by a link $M^4$ with an arm $M^5$ fast to the shaft $H^9$, and the latter being formed with a wide slot $M^6$ wherein engages a pin $M^7$ projecting from the slide $O^5$ which carries the cam $O^4$. As a result, when the hand lever M is thrown to the left, its arm $M^2$ is rocked upwardly to draw the feeler J downwardly across the mouth of the magazine, while its other arm $M^3$ is rocked downwardly to impart a like movement to the cam $O^4$, which then pushes the plunger $O^2$ inwardly to move the plate O to locking position, it also being noted that the width of the slot $M^6$ is such as to allow the preceding movement of the feeler J to the required extent. To provide for the operation of the feeler K, its operating arm $K^2$ is extended downwardly into engagement with a pin $K^3$ projecting from an arm $K^4$ fast to the shaft $H^9$, which thus by its rotation moves the feeler K into the distributer simultaneously with the movement of the feeler J across the magazine. It can be seen, therefore, that the means for operating these two feelers and the matrix locking plate offer no impediment to the interchange of magazine arrangements as above described, all of the parts being arranged in the main frame with the exception of the plunger $O^2$, which in one case is carried by one of the bracket plates $g^3$ and in the other by the supplemental supporting frame G.

The removal of the magazine is effected in the well known manner: As shown, the frame $g$ is provided with the usual cam pieces $g^4$, coöperating with rollers $g^5$ on the bracket plates $g^3$, and which by being drawn forwardly rock the supporting frame $g$ upwardly about the bar $G^4$ as a pivot to locate the magazine above the assembling devices.

In the present instance, means are provided to prevent the removal of the magazine until the matrices are first locked therein or while any are still in course of distribution or protruding from the magazine. Such means, in conjunction with the foregoing devices, comprise a pivoted locking pawl $h$, sustained by one of the bracket plates $g^3$, and having its forward end arranged in position to be engaged by the cam $O^4$ and its rear end arranged to coöperate with a lug $h^1$ offset laterally from one of the cam pieces $g^4$. When the parts are in normal position, the pawl $h$ stands in engagement with the lug $h^1$ and locks the cam pieces $g^4$ against rotation, but when the cam $O^4$ is drawn downwardly by the hand lever M to actuate the plunger $O^2$, it engages the locking pawl and rocks it out of engagement with the lug $h^1$.

As previously stated, I have shown my improvements merely in preferred form and by way of example and as applied to the particuar kind of machine described, but it will be obvious that many modifications and alterations will readily suggest themselves to those skilled in the art without departing from the scope of the invention.

Having thus described my invention, its construction and mode of operation, what I claim and desire to secure by Letters Patent of the United States is as follows:

1. In a typographical machine, the combination with a plurality of magazines and a shift frame therefor, of power-operated mechanism for moving the shift frame to bring any selected magazine into operation, the said mechanism including a pair of screw rods loosely connected to the shift frame at opposite sides thereof, rotating sleeves or nuts threaded to the screw rods and having gears fixed thereto, a transverse rotary shaft provided with driving gears meshing with the sleeve gears and further with a driven gear, a fore-and-aft shaft provided at its rear end with a driving gear meshing with the driven gear of the transverse shaft and at its forward end with a driven gear, a constantly rotating shaft provided with two loosely mounted driving gears engaging the driven gear of the fore-and-aft shaft on opposite sides and with a clutch member movable into engagement with one or the other of said driving gears, and a hand lever controlling the movements of the clutch member.

2. In a typographical machine, the combination with a plurality of magazines and a shift frame therefor, of power-operated mechanism for moving the shift frame to bring any selected magazine into operation, the said mechanism including a pair of screw rods loosely connected to the shift frame at opposite sides thereof, rotating sleeves or nuts threaded to the screw rods and having gears fixed thereto, a transverse rotary shaft provided with driving gears meshing with the sleeve gears, a constantly driven shaft, and intermediate connections for communicating the motion of the constantly driven shaft to the transverse rotary shaft when desired.

3. A structure as specified in claim 1, characterized by the fact that the gears of the transverse rotary shaft and the screw rotating nuts are formed with spiral or helical intermeshing teeth, for the purpose described.

4. A structure as specified in claim 1, characterized by the fact that the magazines, their shift frame, the screw rods, their rotating sleeves or nuts, the transverse rotary shaft, and the intermediate gearing, are all mounted in and carried by a supplemental supporting frame, while the remaining elements of the power-operated mechanism are mounted in the main frame of the machine.

5. In a typographical machine, the combination of a plurality of magazines, a shift frame therefor movable to bring any selected magazine into operation, a supplemental supporting frame wherein the shift frame is mounted and capable of being applied to or removed from the main frame as desired, and mechanism for effecting the movements of the shift frame in the supplemental supporting frame, the said mechanism including elements mounted partly in the main frame and partly in the supplemental frame.

6. A structure as specified in claim 5, characterized by the fact that the elements of the shifting mechanism are arranged to be freely connected and disconnected as the supplemental frame is applied to and removed from the main frame, respectively.

7. A structure as specified in claim 5, characterized by the fact that the shifting mechanism includes a power driven shaft mounted in the main frame.

8. In a typographical machine, the combination of a plurality of magazines, a shift frame therefor movable to bring any selected magazine into operation and provided at opposite sides with transverse guiding pieces, and rollers engaging the opposite edges of each of the guiding pieces and journaled to a relatively fixed part of the machine.

9. In a typographical machine, the combination of an assembler entrance, a plurality of magazines, a shift frame wherein the magazines are removably mounted, and power-operated mechanism for moving the shift frame to bring any selected magazine into registration with the assembler entrance, the said mechanism having a range of action sufficient to move the shift frame to an extreme position wherein the lowermost magazine is located above the assembler entrance for removal.

10. A structure as specified in claim 9, in combination with means for arresting the movement of the shift frame in the extreme position therein referred to.

11. A structure as specified in claim 9, in combination with a locking device to support the shift frame in the extreme position therein referred to.

12. In a typographical machine, the combination of a plurality of magazines, a supporting frame therefor comprising two connected side members formed with longitudinal parallel ledges providing grooves wherein projecting portions of the magazines engage, and strips attached to the forward edges of the two side members and formed with lips or shoulders projecting partly across the grooves to provide abutments against which the magazines rest and by which they are held in place.

13. A structure as specified in claim 12, characterized by the fact that certain of the ledges of the two side members are recessed or cut away at their forward ends to permit the magazines to be raised in effecting their disengagement from the abutments referred to in said claim.

14. In a typographical machine, the combination of a magazine formed with laterally projection portions, a supporting frame formed at opposite sides with grooves wherein the projecting portions of the magazine engage, and strips attached to the supporting frame and formed with lips or shoulders projecting partly across the grooves and engaging the projecting portions of the magazine to hold the latter in place.

15. In a typographical machine, the combination of a plurality of magazines each provided with a movable matrix locking device, power-operated mechanism for shifting the magazines to bring any selected one thereof into operation, and means to prevent the operation of said mechanism until the matrix locking device of the operative magazine has been moved to active position.

16. In a typographical machine, the combination of a plurality of magazines each provided with a movable matrix locking device, power-operated mechanism for shifting the magazines to bring any selected one thereof into operation, a hand lever controlling the operation of said mechanism and provided with a relatively movable grip portion, means adapted to be released by the relative movement of the grip portion for holding the hand lever against operation, and means actuated by such relative movement of the grip portion for moving the matrix locking device of the operative magazine to active position.

17. In a typographical machine, the combination of a plurality of magazines each provided with a movable matrix locking device, power-operated mechanism for shifting the magazines to bring any selected one into operation, a hand lever controlling the operation of said mechanism, and means actuated by said hand lever, preparatory to the engagement of the power-operated mechanism, for moving the matrix locking device of the operative magazine to active position.

18. In a typographical machine, the combination of a plurality of magazines each provided with a movable matrix locking device, power-operated mechanism for shifting the magazines to bring any selected one thereof into operation, and automatic means, actuated preparatory to the engagement of the power-operated mechanism, for moving the matrix locking device of the operative magazine to active position.

19. In a typographical machine, the combination of a plurality of magazines each provided with a matrix locking device, a shift frame wherein the magazines are mounted, power-operated mechanism for moving the shift frame to bring any selected magazine into operation, a locking device to hold the shift frame in its moved position, means actuated preparatory to the engagement of the power-operated mechanism for moving the matrix locking device of the operative magazine to active position, and means acting automatically after the engagement of the power-operated mechanism for moving the magazine locking device to inactive position.

20. In a typographical machine, the combination of a plurality of magazines each provided with a matrix locking device, a shift frame wherein the magazines are mounted, power-operated mechanism for moving the shift frame to bring any selected magazine into operation, a controlling hand lever provided with a grip portion movable relatively thereto preparatory to the engagement of said mechanism, a locking device to hold the shift frame in its moved position, means actuated by the relative movement of the grip portion for moving the matrix locking device of the operative magazine to active position, and spring actuated means also controlled by said grip portion and acting after the power-operated mechanism is engaged to move the magazine locking device to inactive position.

21. In a typographical machine, the combination of a plurality of shiftable magazines each provided with a matrix locking device, mechanism for shifting the magazines to bring any selected one into operation, a locking device to hold the magazines in their shifted position, means for moving said magazine locking device to inactive position, and means for preliminarily moving the matrix locking device of the operative magazine to active position; whereby the matrices are locked in the operative magazine before the magazines are unlocked.

22. In a typographical machine, the combination of a plurality of shiftable magazines, mechanism for shifting the magazines to bring any selected one into operation, a matrix locking plate carried by each magazine and movable laterally thereof in opposite directions to active or inactive position, and means for moving the locking plate of the operative magazine to active position before the magazines are shifted.

23. A structure as specified in claim 18, characterized by the fact that the matrix locking device therein referred to is in the form of a plate movable laterally of the magazine and formed with ribs which in the inactive position of the plate register with those of the magazine and in the active position of the plate are located out of registry with the magazine ribs.

24. In a typographical machine, the combination of a plurality of shiftable magazines, mechanism for shifting them to bring any selected magazine into operation, a matrix locking plate carried by each magazine and movable laterally thereof to active or inactive position, and means for moving the locking plates to active position, the said means including an actuating plunger mounted independently of the magazines and common to all of them and arranged in position to engage the locking plate of the selected magazine when brought into operation.

25. In a typographical machine, the combination of a plurality of shiftable magazines, mechanism for shifting them to bring any selected one into operation, a matrix locking device carried by each magazine, automatic means for moving the locking device of the operative magazine to active position before the magazines are shifted, and means controlled by the operator for moving to inactive position the locking device of the new magazine brought into operation.

26. In a typographical machine, the combination of a magazine, a matrix locking plate carried thereby and movable laterally thereof to active or inactive position, and means for moving the locking plate to active position, the said means including an actuating plunger arranged to engage the plate at one end, and a reciprocating cam controlling the movements of the plunger.

27. In a typographical machine, the combination of a channeled magazine provided with a matrix locking device, positively actuated means for moving the locking device to active position, and a yielding element interposed between said actuating means and the locking device.

28. In a typographical machine, the combination of a channeled magazine, a matrix locking plate carried by the magazine and movable laterally thereof to active or inactive position, an actuating member for moving the locking plate laterally to active position, and a yielding element interposed between said actuating member and the locking plate.

29. In a typographical machine, the combination of a channeled magazine, a matrix locking plate carried by the magazine and movable laterally thereof to active or inactive position, an actuating member for moving the locking plate laterally to active position, and a yielding element carried by the locking plate and arranged to be engaged by the actuating member.

30. In a typographical machine, the combination of a magazine formed with ribs to provide grooves wherein the matrices travel, and a laterally movable matrix locking plate formed with similar ribs which are shifted into and out of registry with the magazine ribs, said plate having its ribs beveled at their rear ends so as to cam back the matrices as the plate is moved to active position.

31. In a typographical machine, the combination of a channeled magazine, a laterally movable matrix locking plate carried thereby, means for moving the plate to active position, and releasable locking means to hold it in such position.

32. A structure as specified in claim 31, in combination with manually controlled means for effecting the release of the locking plate and for restoring it to inactive position.

33. A structure as specified in claim 32, characterized by the fact that the releasable locking means are in the form of a spring-actuated detent to engage the matrix locking plate and formed with a laterally projecting pin, and that the manually controlled means include a rotary cam which first engages the projecting pin to disengage the detent from the locking plate and thereafter engages said plate to restore it to inactive position.

34. In a typographical machine, the combination of a magazine movable at will from its operative position, and a matrix feeler mounted independently of the magazine and movable transversely across one end thereof to detect the presence of protruding matrices, the said feeler being beveled at its lower edge so as to engage any slightly protruding matrices and cam them back within the magazine.

35. In a typographical machine, the combination of a plurality of shiftable magazines, mechanism for shifting them to bring any selected one into operation, and a matrix feeler arranged to move across the end of the operative magazine to detect the presence of protruding matrices, the said feeler being beveled at its lower edge so as to engage any slightly protruding matrices and cam them back within the magazine.

36. In a typographical machine, the combination of a magazine movable at will from its operative position, a locking device to hold the magazine in such position, a matrix feeler movable across the end of the magazine, and means for moving the matrix feeler independently of the locking device.

37. In a typographical machine, the combination of a magazine movable at will from its operative position, a locking device to hold the magazine in such position, and means operable while the magazine is so locked for detecting the presence of any matrices protruding therefrom.

38. In a typographical machine, the combination of a plurality of shiftable magazines, mechanism for shifting them to bring any selected one into operation, a locking device to hold the magazines in their shifted position, a matrix feeler movable across the end of the operative magazine, and means for moving the feeler independently of the locking device.

39. In a typographical machine, the combination of a plurality of shiftable magazines, power-operated mechanism for shifting the magazines to bring any selected one into operation, a matrix feeler movable across the end of the operative magazine, and means to prevent the operation of said mechanism until the feeler has been so moved.

40. In a typographical machine, the combination of a plurality of shiftable magazines, power-operated mechanism for shifting them to bring any selected one into operation, a controlling hand lever provided with a grip portion movable relatively thereto preparatory to the engagement of said mechanism, a matrix feeler movable across the end of the operative magazine, and means actuated by the relative movement of the grip portion for simultaneously effecting the movement of the matrix feeler.

41. In a typographical machine, the combination of a plurality of shiftable magazines, power-operated mechanism for shifting them to bring any selected one into operation, a matrix feeler movable across the end of the operative magazine, and automatic means, actuated preparatory to the engagement of the power-operated mechanism, for effecting the movement of the matrix feeler.

42. In a typographical machine, the combination of a plurality of shiftable magazines, power-operated mechanism for shifting them to bring any selected one into operation, a locking device to hold the magazines in their shifted position, a matrix feeler movable across the end of the operative magazine, and means actuated preparatory to the engagement of the power-operated mechanism for effecting the movement of the matrix feeler and acting after the engagement of said mechanism to effect the movement of the locking device to inactive position.

43. In a typographical machine, the combination of a magazine provided with a matrix locking device movable at will to active position, a matrix feeler movable across the end of the magazine, and means adapted when operated to effect first the movement of the matrix feeler and then the movement of the matrix locking device.

44. In a typographical machine, the combination of a plurality of shiftable magazines, each provided with a movable matrix locking device, mechanism for shifting the magazines to bring any selected one into operation, a matrix feeler movable across the end of the operative magazine, and automatic means, actuated before the shifting of the magazines, for effecting first the movement of the matrix feeler across the operative magazine and then the movement of the matrix locking device of said magazine to active position.

45. A structure as specified in claim 18, in combination with a matrix feeler movable across the end of the operative magazine and arranged to be operated in advance of the matrix locking device of that magazine.

46. In a typographical machine, the combination with a main frame constructed to receive either a single or multiple magazine unit as desired, of a matrix feeler and operating means therefor, both mounted in the main frame in position to coöperate with either magazine unit when inserted therein.

47. In a typographical machine, the combination with a main frame constructed to receive either a single or multiple magazine unit as desired, each unit having a matrix locking device for the operative magazine, of means mounted in the main frame for operating said matrix locking device of either magazine unit when inserted therein.

48. In a typographical machine, the combination with a main frame constructed to receive either a single or multiple magazine unit as desired, each unit having a locking device to hold the operative magazine in position, of means mounted in the main frame for operating said locking device of either magazine unit when inserted therein.

49. In a typographical machine, the combination of a plurality of magazines, a shift frame therefor movable to bring any selected one into operation, a supplemental supporting frame wherein the shift frame is movably mounted and capable of being applied to or removed from the machine as desired, a locking device carried by the supplemental supporting frame for holding the shift frame in its moved position therein, and means for operating said locking device, the said means including elements mounted partly in the supplemental frame and partly in the main frame and arranged to be connected and disconnected as the supplemental frame is applied to and removed from the main frame, respectively.

In testimony whereof I have affixed my signature hereto.

DAVID S. KENNEDY.